United States Patent [19]

Kraemer, II

[11] 3,738,489

[45] June 12, 1973

[54] ANTI-POLLUTION RECIRCULATION TANK FOR MARINE AND SIMILAR USE

[76] Inventor: George P. Kraemer, II, 4377 N. Marlborough Drive, Shorewood, Wis. 53211

[22] Filed: May 24, 1971

[21] Appl. No.: 146,264

[52] U.S. Cl. ............... 210/94, 4/10, 210/152, 210/411
[51] Int. Cl. ............................. B01d 35/02
[58] Field of Search ............ 210/94, 95, 152, 210/441, 411; 4/10

[56] References Cited
UNITED STATES PATENTS
3,673,614  7/1972  Claunch .................. 210/152 X
3,616,914  11/1971  Reid ........................ 210/152 X
864,345  8/1907  Tolleson .................. 210/411 X
3,674,148  7/1972  Miller et al. ............ 210/152

*Primary Examiner*—John Adee
*Attorney*—Donald G. Casser and Allan W. Leiser

[57] ABSTRACT

A recirculating tank suitable for receiving effluent from a marine head, or similar device, having an improved filter means comprising a filter element which is circumferentially surrounded by the holding tank primary chamber and has a bottom spaced above the bottom of the holding tank. As another feature, the improved filter construction is attached to only one wall of the holding tank and extends therein; to further extend its utility, the filter element is provided with a transparent visual inspection plate located on the exterior of the holding tank.

6 Claims, 7 Drawing Figures

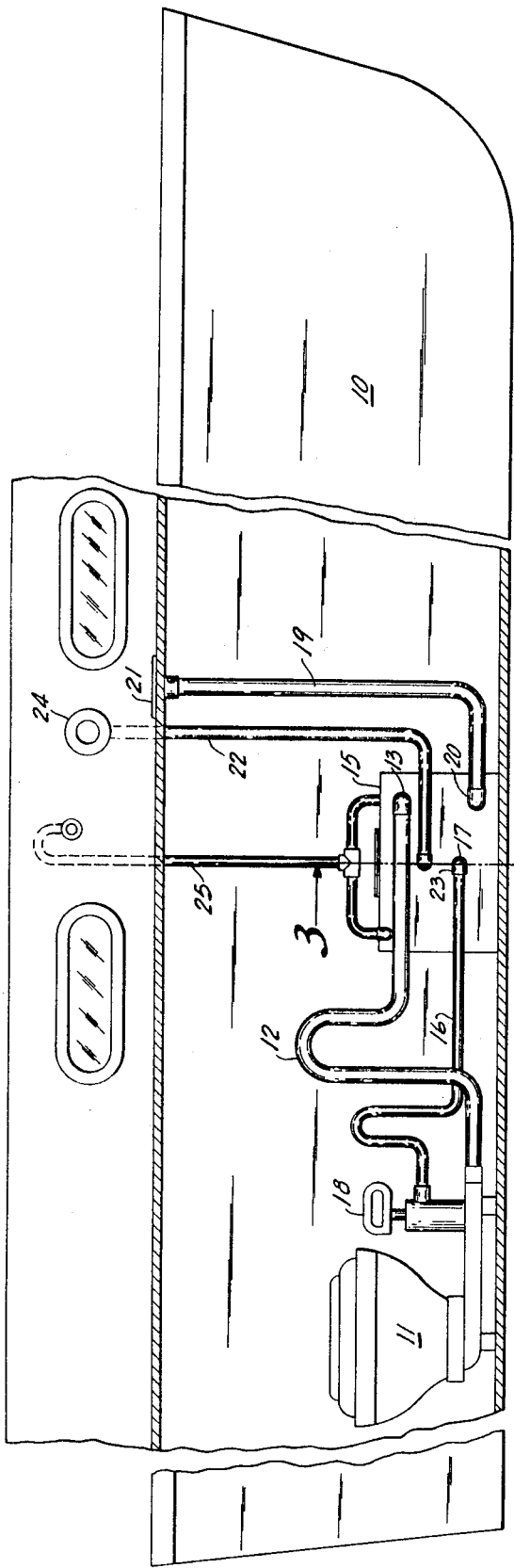
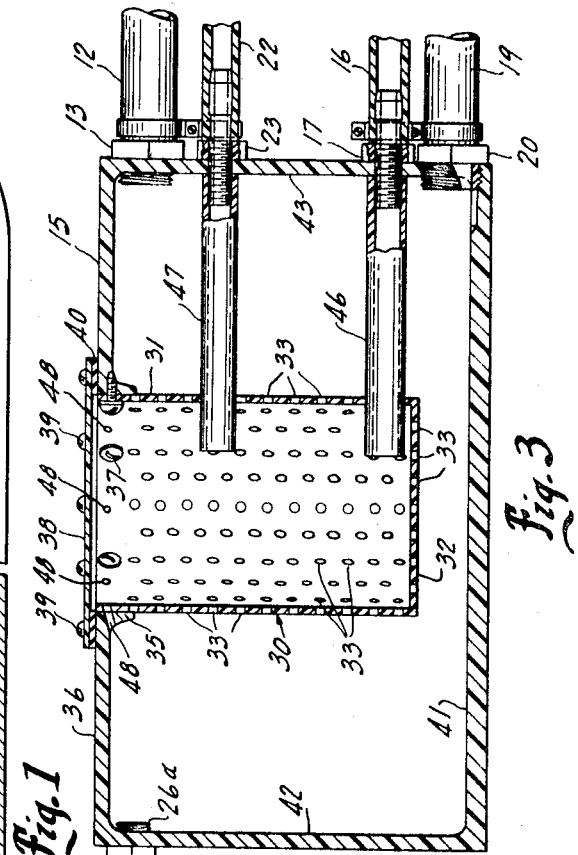
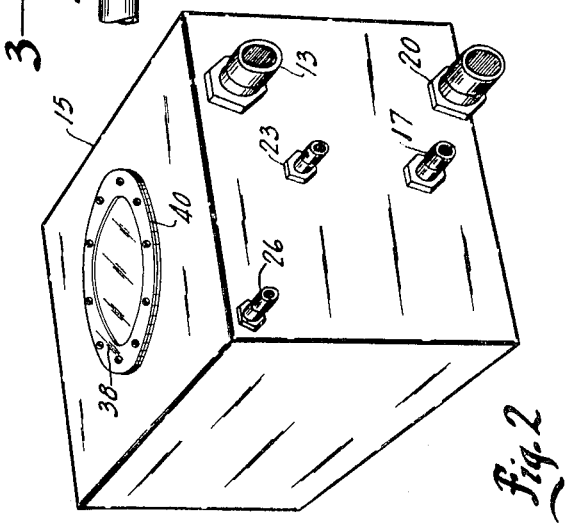
INVENTOR.
GEORGE P. KRAEMER II
ATTORNEY

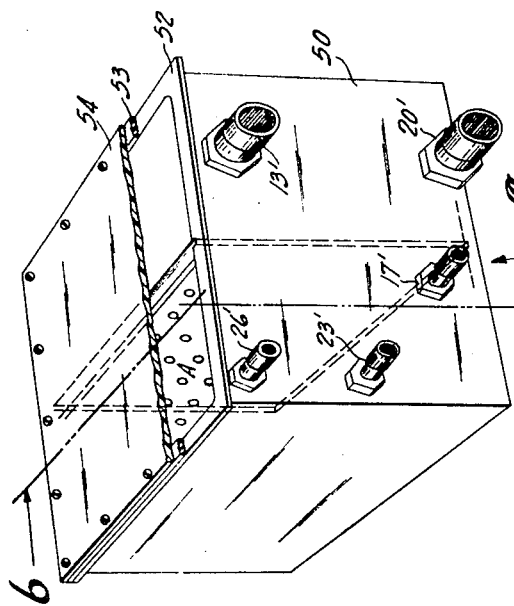
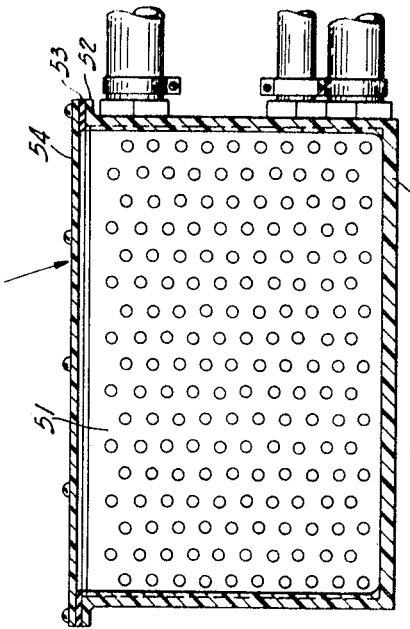
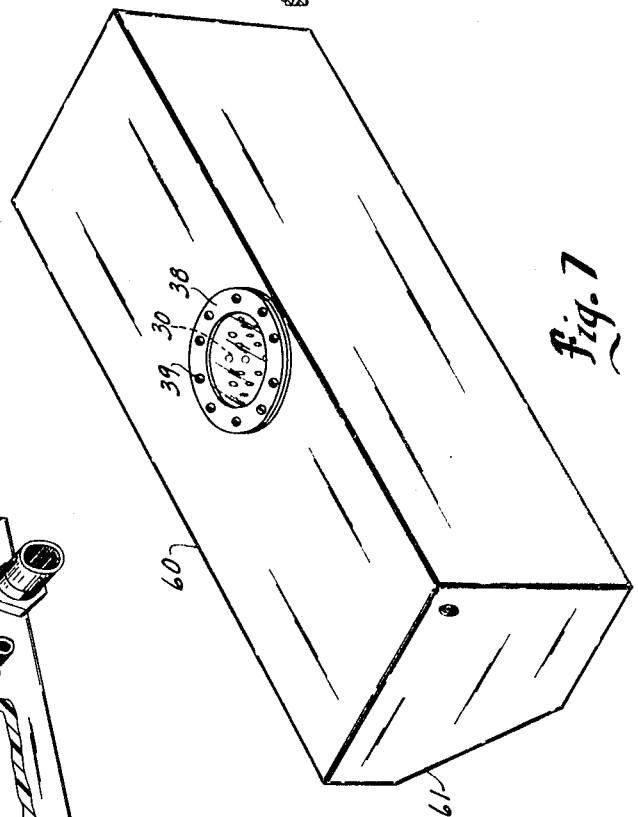
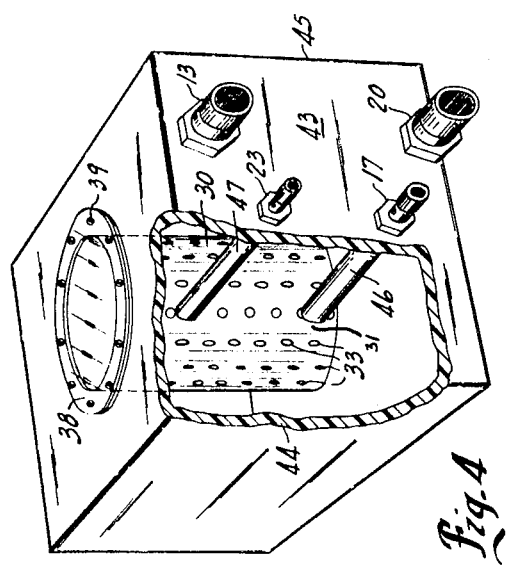

ANTI-POLLUTION RECIRCULATION TANK FOR MARINE AND SIMILAR USE

BACKGROUND OF THE INVENTION

1. Field

My present invention relates to the art of holding tanks adapted to receive the discharge from a toilet such as a marine head; still more specifically, the invention relates to a holding tank of the recirculating type which is adapted to receive discharge liquid from a head, filter the liquid and recirculate filtered water for further flushing of the head, while storing solids in the holding tank for eventual pump-out.

2. Prior Art

The increased emphasis upon anti-pollution devices for controlling the discharge of wastes into water has led to the development in the last several years of holding tanks for containing the materials discharged from marine heads or toilets. Holding tanks are intended to store such discharge liquids until they can be pumped out at a suitable land station, rather than permitting the heads to discharge waste liquids containing human feces, etc., directly into the water.

State regulations require the installation of holding tanks or suitable devices on pleasure boats, and it is expected that the future will see such requirements extended to all vessels navigating lake, river and shoreline areas. For example, the New York Times boating section for Apr. 25, 1971 states, at page 1, that New York state will begin "vigorous" enforcement of laws prohibiting discharge of pollutants into water, and also states at page 7 that discharge is becoming a problem in the Carribean.

An extension of holding tank devices has been the so-called recirculating and holding tanks which add the function of filtering liquids discharged from a head and recirculating a supply of clarified water for subsequent use. Thus the discharge containing waste materials is filtered to remove solids suspended therein and then recirculated back to the head for additional flushing purposes. A pure holding tank does not include a filtering system, but a recirculating and holding tank requires a filter construction inside the tank in order to provide clarified water for recirculation.

A typical prior art solution for installing a filter in a recirculating holding tank has been a construction wherein a perforated wall divides the tank into two chambers, with the discharge liquid being exhausted into one chamber and the clarified water delivered from the other chamber. This type of prior art recirculating holding tank, however, has been found to present a number of problems: the filter can become clogged fairly easily; residual solid deposits build up which impair the effectiveness of the clarification action of the device; the tank construction is comparitively expensive to manufacture; and it is difficult to provide for visual inspection of the condition of the filter. Another prior art recirculating holding tank construction involves the use of a floating filter element, but tanks of this construction involve parts which require an operating mechanical linkage, and have particular requirements as to the manner in which the tank can be placed in a boat in order to function properly. Thus the problem still persists of providing a recirculating holding tank suitable for marine and similar use which will include an effective filter means.

SUMMARY OF THE PRESENT INVENTION

My present invention provides a recirculating holding tank which has a filter comprising a perforated member inserted within the tank by attachment to one wall thereof, so as to be completely enveloped by an spaced from the other walls of the holding tank. The filter includes a bottom wall which is spaced above the bottom of the tank. As a further feature, the tank construction of my invention includes a transparent visual inspection port over the top of the filter so that the user may periodically inspect it to determine its condition.

A recirculating holding tank incorporating a filter construction according to this invention has been found to possess a number of important advantages. Briefly, some of the important advantages include an enhanced filter efficiency; improvement in the ease of manufacture of the tank, and the filter element, and in the attachment of the filter to the tank; and the provision of a recirculating holding tank which can be arranged in a boat in a variety of positions and still function effectively; and the provision of a recirculating holding tank which can be made in various configurations.

A primary object of this invention is to provide a new filter construction for a recirculating holding tank suitable for marine and similar uses. Another is to provide a new filter construction for a recirculating holding tank which will enable the production of a single-piece molded tank unit. Other main objects are to provide an improved structural means for attachment of a filter unit within a recirculating holding tank, to provide for visual inspection of the filter, and to provide a filter and tank construction which will minimize leakage problems. A more specific object is to provide the particular details of the construction as hereinafter claimed.

DESCRIPTION OF THE DRAWINGS

The present invention will be described with reference to two presently-preferred specific embodiments shown in the accompanying drawings as illustrative examples, wherein:

FIG. 1 is a side view with portions broken away of a boat incorporating a recirculating holding tank of the present invention;

FIG. 2 is a perspective view of the recirculating holding tank shown in FIG. 1;

FIG. 3 is a longitudinal sectional view of the tank of FIG. 2 taken along the plane of line 3—3 in FIG. 1;

FIG. 4 is a perspective view with a portion broken away of the tank of FIG. 2;

FIG. 5 is a perspective view, with portions broken away, of a prior art holding tank construction shown herein for comparison purposes;

FIG. 6 is a longitudinal sectional view of the tank of FIG. 5; and

FIG. 7 is a perspective view of a second form of recirculating holding tank of the present invention.

DESCRIPTION OF PREFERRED EMBODIMENTS

FIG. 1 illustrates a boat 10 which includes a head 11 connected to a recirculating holding tank 15 constructed according to this invention. A head discharge line 12 is connected to an effluent inlet 13 of the recirculating holding tank 15 which collects and clarifies liquid discharged from the head. In some installations, the head may discharge directly into the tank 15 and in such case, a discharge means other than a line may be employed such as a discharge opening, passageway or discharge valve. Clarified water is delivered through a recirculation line 16 for subsequent flushing of the head, the recirculation line 16 being connected to a recirculation port 17 attached to a wall of the tank 15. A user operates a pump 18 to flush discharge liquids from the head 11 into the recirculating holding tank 15, and thereafter operates a valve (not shown) so that continued actuation of the pump 18 will withdraw clarified water from the tank 15 for flushing the head.

A drain line 19 is attached to a discharge fitting 20 carried on the wall of the tank 15 and leads to a deck level pump-out fitting 21. After the tank 15 has become filled with waste materials or fluids, the operator then docks at a suitable pump-out facility to empty the holding tank through attachment of a suitable apparatus to the deck fitting 21.

A back flush line 22 is connected to a fitting 23 attached to the tank 15, and has an appropriate connection 24 located in a convenient position on the exterior of the boat so that the entire system may be periodically flushed with clean water. The tank 15 is vented to the atmosphere by means of a vent line 25 which is connected to a vent fitting 26 near one upper corner of the tank and to a similar fitting 26a (see FIG. 3) at an opposite upper corner of the tank.

Turning now to FIG. 3, the recirculating holding tank 15 incorporates a filter 30 constructed according to this invention. In the form shown in the tank of FIGS. 1-4, the filter 30 has a side wall 31 and a bottom wall 32, with perforations 33 formed in the side and bottom walls. The side wall of the filter is in the shape of a circular cylinder in the illustrated form, although other configurations may be used. Perforations 33, one-eighth inch in diameter spaced in a staggered pattern of 1/4 inch centers are satisfactory, with other sizes or patterns also being useful. The filter 30 is attached to an annular flange 35 which depends from the top wall 36 of the holding tank 15, the attachment being by means of a plurality of screws 37 or other suitable fasteners which extend through the side wall 31 of the filter and into the flange 35; the filter may also be attached to the flange by use of threads, a flange and pressure plate construction, a twist-lock arrangement, or other joinder means, most effectively of a type which enables detachment of the filter from the flange for service or maintenance. Also, the filter may include an outwardly-turned flange, formed as an integral portion or as a separate member attached to the filter, and such outwardly-turned flange can be fastened to the exterior of the tank wall. The depending flange 35, however, is a particularly useful feature because of cost and because it provides structural reinforcement for the top wall 36. A transparent window 38 extends across the open top of the filter 30 and is secured to the top wall 36 of the tank, by means of screw fasteners 39, with a suitable gasket 40 positioned between the window 38 and the outer surface of the top wall 36 in order to prevent leakage.

The bottom wall 32 of the filter is spaced above the bottom wall 41 of the ank 15 at a distance to be above the expected level of accumulated sludge. The side wall 31 of the filter is spaced from the end walls 42 and 43 of the tank. The perspective view of FIG. 4 shows that the side wall 31 of the filter is also spaced from the side walls 44 and 45 of the tank. Thus, the filter 30 is attached to one wall of the tank and arranged to be spaced from the remaining walls of the tank so that the tank envelopes the perforated walls of the filter.

Returning again to FIG. 3, a line 46 leads from the recirculation fitting 17 into the interior of the filter 30, and line 47 leads from the back flush fitting 23 into the interior of the filter 30.

As best depicted in FIG. 3, a vent 48 extends through the side wall 31 of the filter 30 and through the flange 35 to provide an air passage between the interior of the filter 30 and the interior of the balance of the tank 15. There may be several such vents 48 spaced about the flange 35. The vent ensures that the liquid level inside the filter 30, which is the level observed by a user through the inspection cover plate or window 38, is the same as the liquid level in the balance of the tank 15 by preventing the build-up of a pocket of air along the upper section of the filter which would prevent the liquid level therein from reaching the same level as in the rest of the tank and thereby give a false reading. The vents 48 establish communication between the filter interior and the rest of the tank so that the air pressure above the liquid in the filter equals the air pressure above the liquid in the rest of the tank and the liquid level in both chambers will thus be at the same height. The vents 48 are most effectively formed about one-half inch below the inspection cover plate 38 to allow the establishment of a form of air seal when the tank is nearly full of liquid; this gives a thin boundary layer of slightly pressurized air above the liquid that reduces liquid contact with the gasket 40 and inspection cover 38. This feature thereby aids in reducing leakage problems around the top of the filter.

The operation of the recirculating holding tank 15 is as follows. The tank is filled with water to a level approximately 1 inch above the line 46 leading from the recirculating line into the filter. This initial water charge also allows for filling of the recirculation line 16. Suitable chemicals are added to the water charge which include settling agents to enhance the break-up of solid matter and improve its settling characteristics, bactericidal agents, wetting agents, perfumes, dyes, etc. Waste effluent from the head is pumped into the holding tank into the main chamber or space surrounding the filter 30 through the effluent inlet 13. After the head has been emptied and the user changes the valve system, clarified water is pumped into the head through the recirculation line 16 and this clarified water is withdrawn from the interior of the filter 30. This action is obtained by the creation of a reduced pressure within the interior of the filter which acts to draw the effluent discharged into the main chamber of the tank through the filter for subsequent delivery to the recirculation line which leads into the interior of the filter through the line 46. Movement of the water through the filter screens out the larger particulate materials, which may include waste matter and cellulosic materials, thereby enabling them to settle to the bottom of the tank as a layer of sludge. Positioning of the bottom of the filter 30 above the bottom of the tank in the manner previously described prevents or reduces recirculation of this accumulated sludge. When the liquid level in the tank reaches the top, the user must empty the tank with appropriate dockside pump-out apparatus; the visual inspection plate 38 over the filter enables the user to determine when this condition has been reached.

The tank 15 and the filter 30 may be made of various suitable materials such as low, medium or high density polyethylene; polypropylene; poly carbonate resin, ABS plastic, fiberglass, metal, etc. The tank can be molded conveniently of plastic material and provide a unit of excellent structural strength and rigidity; use of high density polyethylene and a ⅜ inch wall thickness has proved effective, although other materials and sizes can be used. The filter 30 can also be made of high density polyethylene which is perforated or molded to develop the necessary perforations, or a suitable filter cartridge or screen can also be employed which are not of the specific structure as the illustrated filter 30 but which were arranged and adapted to function in the same manner.

A prior form of recirculating holding tank 50 is illustrated in FIGS. 5 and 6 that comprises a rectangular tank including a filter 51 formed as a perforated wall extending across the middle of the tank to divide the tank into two separate compartments. The various fittings for connections of the appropriate lines are shown as fittings 13', 17', 20', 23' and 26' to correspond with the numbering used for the same elements in the tank 15 as shown in FIG. 2. An outwardly turned peripheral flange 52 surrounds the upper edge of the tank, and the top 54 of the tank is attached to the flange 52 with a rectangular gasket 53 interposed therebetween.

FIG. 7 illustrates another form of holding tank incorporating a filter 30 covered by a transparent inspection port 38 as described previously in connection with FIGS. 1-4. The recirculating holding tank 60 is in the form of a long narrow body having an elongated sloping side wall 61 forming one of its enclosure panels. A tank 60 may often be required in order to fit a holding tank into particular shaped boats wherein the interior space is limited in its several dimensions. The filter 30 is attached to the upper wall of the holding tank 60, as was the case with the tank 15, extends into the interior thereof, and is arranged to be spaced from the remaining walls of the tank. An advantage of the filter 30 of this invention is that the tank 60 is able to provide efficient water clarification regardless of its configuration, since the filtering action achieved with a filter of the construction herein disclosed is independent of the shape of the tank in which it is installed, It will be noted, in contrast, that the prior art style of construction as shown in FIGS. 5 and 6 renders it difficult to provide a holding tank in the shape of FIG. 7 and still obtain adequate and dependable clarification action.

It has been found that the tanks 15 and 60 incorporating a filter construction 30 in accordance with this invention have a number of important advantages in comparison to the prior art tank 50.

Firstly, the provision of a filter 30 with a bottom wall spaced above the bottom wall of the tank enables the furnishing of water for recirculation which is of an improved clarity because solids in the water can deposit and remain in the space between the bottom of the filter and the bottom wall of the tank. This reduces the amount of solids contained in the water supplied to the recirculation line 16. In the tank 50, however, solid materials can settle in the compartment A and become transported into the recirculating system.

Secondly, the construction of the filter 30 and its mode of attachment to the tank enables the provision of the transparent inspection cover 38 so that a user can check the unit to determine that it has been filled to the proper level for its initial water charge, to determine if the tank is ready for pump-out, and to determine whether the filter has become clogged, as by build-up of residual deposits. The provision of an inspection plate of this type is difficult with a tank of the construction of the tank 50.

Another important advantage is that there is a reduction in the leakage problems with the filter 30 because the sealing gasket used underneath the inspection plate 38 can be smaller than the size of gasket 52 required for the tank 50 and through the provision of the vents 48.

The provision of a filter 30 enables the manufacture of the tank 15 as a molded six-sided unit, and it can be made with even more surfaces (e.g. see FIG. 7) instead of being limited to the open-top construction of the tank 50. The feature has the further beneficial effect of improving the structural rigidity of the tank 15 in comparison to the tank 50 since it has been noted that an open top tank of the latter type will have a tendency for its side walls to become bowed inwardly due to the lack of a top wall; excessive bowing in of the side walls can lead to an unusuable molded piece.

The use of the filter 30 has an advantage in that it reduces the tooling and machinery required for its manufacture and the jigs and fixtures needed for its assembly inasmuch as it enables the manufacturer to employ a filter having a standard cross-sectional size and then vary the length of the filter in accordance with a specific tank size. However, each different size of tank 50 necessitates a particular size of filter element 51.

The provision of a filter 30 as a member having a side wall completely surrounded by the tank enclosure allows the filter to be located about the geometric center of the tank and allows the recirculation and back flush lines to lead directly into the interior of the filter. This helps insure the delivery of clean water to the head, and further aids in satisfactory operation of the unit regardless of the angle of the boat; the latter aspect is particularly important when the holding tank is to be installed on a sailboat which will sail at various angles of heel.

The filter that can be incorporated in the tank of this invention is a readily removable unit that can be attached to the tank by mechanical fasteners or by other detachable connection means, which enable the filter to be detached from the tank, whereas the filter wall element 51 usually was not removable since it had to be thermally fused or welded to the interior of the tank. The removability of the filter 30 facilitates corrective action when an object enters the tank and obstructs proper operation of the filter or other fittings of the holding tank.

There has thus been described a recirculating holding tank suitable for marine use, and similar uses such as in a trailer, home, cottage, etc., which is capable of satisfying the stated objects of the present invention. It has been shown that the combination of a filter of this invention with a holding tank leads to advantages not attainable with a prior art form as illustrated herein. This is achieved with a unit which is simple of manufacture yet dependable in operation, so that it is possible to manufacture a sturdy apparatus that will require a minimal amount of upkeep in order to perform satisfactory. The present tank construction also eliminates moving parts and mechanical linkages such as are associated with tanks having a floating filter element. Some features of the recirculating tank described herein may be incorporated in a holding tank which does not include provision for recirculation of clarified water. For example, the inspection cover plate 38 is more effective for a holding tank than the sight gauges now typically used, and it may be incorporated therewith as a separate transparent plate attached to a wall or formed as a transparent wall section; in either case, the inspection member forms a portion of a wall of the tank instead of being a sight gauge type of element which is attached to the tank.

Although this invention has been illustrated herein with reference to certain specific presently-preferred embodiments, it is to be understood that changes may be made in the forms illustrated which will remain within the true spirit and scope of the present invention.

I claim:

1. In a liquid waste collection system of the type including a toilet such as a marine head and a recirculating holding tank for receiving and storing waste effluent containing water and solids, the system including discharge means arranged to direct waste effluent from the toilet to the tank and a recirculation line arranged to carry clarified water from the tank to the toilet, the improvement wherein:
   1. the holding tank includes a first wall, a bottom wall, and other walls which define a tank enclosure;
   2. a filter is attached to the first wall of the tank, the filter having a perforated wall which is arranged inside the tank, the filter being spaced from the other walls of the tank to define a filter interior chamber separated from the interior of the tank, and the filter having a bottom portion spaced from the bottom wall of the tank;
   3. the discharge is arranged in communication with the interior of the tank in the space between the walls of the tank and the perforated wall of the filter;
   4. the recirculation line is arranged in communication with the filter interior chamber; and
   5. solids from the waste effluent are stored in the space between the bottom portion of the filter and the bottom wall of the holding tank, and water from the waste effluent is clarified by the filter for delivery through the recirculation line.

2. A holding tank in accordance with claim 1, wherein:
   the first wall of the tank includes an annular flange depending therefrom and extending into the interior of the tank,
   and wherein the perforated wall of the filter is attached to the annular flange.

3. A holding tank according to claim 2, further including:
   air vent passage means extending through the annular flange and the wall of the filter to provide an air passageway between the filter interior chamber and the interior of the tank, said air vent passage means being spaced from the first wall of the tank.

4. A holding tank constructed in accordance with claim 1, further including:
   a transparent inspection cover attached to the first wall of the tank and extending across the top of the filter.

5. A holding tank according to claim 2, further including:
   a transparent inspection cover attached to the first wall of the tank and extending across the top of the filter.

6. A holding tank according to claim 1, further including
   a back flush connection line leading from the wall of the tank into the filter interior chamber and spaced above the recirculation line, the back flush line being adapted for supply of clean water from an external surface for periodic cleansing of the tank.

* * * * *

PO-1050
(5/69)

UNITED STATES PATENT OFFICE
CERTIFICATE OF CORRECTION

Patent No. 3,738,489    Dated June 12, 1973

Inventor(s) George P. Kraemer, II

It is certified that error appears in the above-identified patent and that said Letters Patent are hereby corrected as shown below:

Column 3, line 62, ``ank'' should read --tank--.

Column 7, line 35, after ``discharge'' insert --means--.

Signed and sealed this 5th day of March 1974.

(SEAL)
Attest:

EDWARD M. FLETCHER, JR.
Attesting Officer

C. MARSHALL DANN
Commissioner of Patents